United States Patent
Trutna et al.

(10) Patent No.: US 9,690,328 B2
(45) Date of Patent: Jun. 27, 2017

(54) INTERNAL DISPLAY MODULE SUPPORT

(71) Applicant: Microsoft Corporation, Redmond, WA (US)

(72) Inventors: Tristan Trutna, Seattle, WA (US); Kurt Jenkins, Sammamish, WA (US); Timothy Large, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 36 days.

(21) Appl. No.: 14/517,023

(22) Filed: Oct. 17, 2014

(65) Prior Publication Data
US 2016/0109906 A1   Apr. 21, 2016

(51) Int. Cl.
| H05K 7/00 | (2006.01) |
|---|---|
| G06F 1/16 | (2006.01) |
| G02F 1/1333 | (2006.01) |
| G06F 1/18 | (2006.01) |
| H04M 1/02 | (2006.01) |

(52) U.S. Cl.
CPC ...... *G06F 1/1637* (2013.01); *G02F 1/133308* (2013.01); *G06F 1/1635* (2013.01); *G06F 1/1643* (2013.01); *G06F 1/183* (2013.01); *H04M 1/0266* (2013.01); *G02F 2001/133317* (2013.01); *G02F 2001/133331* (2013.01); *G02F 2201/503* (2013.01); *G02F 2201/54* (2013.01); *H04M 2250/22* (2013.01)

(58) Field of Classification Search
USPC ............. 361/747, 807, 809, 810, 679.21
See application file for complete search history.

(56) References Cited

U.S. PATENT DOCUMENTS

| 6,151,207 A * | 11/2000 | Kim ................ G06F 1/1637 349/58 |
|---|---|---|
| 6,292,239 B1 * | 9/2001 | Nagamura ........ G02F 1/133308 349/58 |
| 6,741,299 B2 * | 5/2004 | Fukayama ........ G02F 1/133308 349/58 |
| 7,413,336 B2 * | 8/2008 | Freking ................ B32B 43/006 362/606 |
| 7,622,015 B2 * | 11/2009 | Nakayama .......... B32B 37/0015 156/272.2 |
| 7,852,424 B2 * | 12/2010 | Sugawara ........ G02F 1/133308 349/122 |
| 8,405,791 B2 * | 3/2013 | Roh ................... G02F 1/133604 349/12 |

(Continued)

OTHER PUBLICATIONS

"International Search Report & Written Opinion for PCT Patent Application No. PCT/US2015/055196", Mailed Date: Dec. 22, 2015, Filed Date: Oct. 13, 2015, 11 Pages.

(Continued)

*Primary Examiner* — Hung S Bui
(74) *Attorney, Agent, or Firm* — Lempia Summerfield Katz LLC (57) ABSTRACT

An electronic device includes an external display layer, a shell disposed opposite the external display layer, a display module component enclosed by the external display layer and the shell, and an internal support that structurally supports the display module component and the external display layer. The internal support includes a plate disposed between the external display layer and the shell.

21 Claims, 3 Drawing Sheets

(56) References Cited

U.S. PATENT DOCUMENTS

| | | | | |
|---|---|---|---|---|
| 8,472,166 B2* | 6/2013 | Kubo | ............... | G02F 1/1306 |
| | | | | 345/173 |
| 8,500,292 B2* | 8/2013 | Lo | ............... | G02F 1/133308 |
| | | | | 362/627 |
| 8,611,077 B2* | 12/2013 | Sanford | ............ | G06F 1/1626 |
| | | | | 361/679.21 |
| 8,662,692 B2 | 3/2014 | Huang et al. | | |
| 8,665,586 B2* | 3/2014 | Lai | ............... | G06F 1/1656 |
| | | | | 349/58 |
| 8,749,492 B2* | 6/2014 | Kotera | ............ | G06F 3/0412 |
| | | | | 345/173 |
| 8,786,799 B2* | 7/2014 | Hsu | ............... | G02F 1/133308 |
| | | | | 349/58 |
| 2005/0285991 A1* | 12/2005 | Yamazaki | ....... | G02F 1/133308 |
| | | | | 349/58 |
| 2009/0290089 A1 | 11/2009 | Ichioka et al. | | |
| 2011/0051348 A1* | 3/2011 | Song | ............ | G02F 1/133308 |
| | | | | 361/679.26 |
| 2012/0140143 A1 | 6/2012 | Wurzel | | |
| 2012/0223896 A1 | 9/2012 | Tseng et al. | | |
| 2013/0021724 A1 | 1/2013 | Chan et al. | | |
| 2014/0036458 A1 | 2/2014 | Sato et al. | | |
| 2014/0092583 A1 | 4/2014 | Franklin et al. | | |
| 2014/0098035 A1 | 4/2014 | Huang et al. | | |
| 2014/0177154 A1* | 6/2014 | Lee | ............... | G06F 1/1637 |
| | | | | 361/679.26 |

OTHER PUBLICATIONS

"The Relevant Parts that Make up the iPhone Display Assembly", iSICKBAY, May 13, 2010, 4 pages, http://www.isickbay.com/call--1-877-476-3776/iphone/iphone_display_assembly.shtml.

Touch Revolution, Future Electronics, Jun. 29, 2013, 3 pages, http://www.futureelectronics.com/en/technologies/semiconductors/lcd-display-solutions/touch-screens/Pages/3016916-F07A-0102.aspx?IM=0.

* cited by examiner

INTERNAL DISPLAY MODULE SUPPORT

DESCRIPTION OF THE DRAWING FIGURES

For a more complete understanding of the disclosure, reference is made to the following detailed description and accompanying drawing figures, in which like reference numerals may be used to identify like elements in the figures.

While the disclosed devices and systems are susceptible of embodiments in various forms, specific embodiments are illustrated in the drawing (and are hereafter described), with the understanding that the disclosure is intended to be illustrative, and is not intended to limit the invention to the specific embodiments described and illustrated herein.

DETAILED DESCRIPTION

Electronic devices include multiple components disposed within a case or shell. The electronic devices may include an internal support in addition to the case or shell. Multiple components of the electronic device may be braced or otherwise structurally supported by the internal support. Examples of supported components include the shell, a transparent cover or other external display layer, and a display module (or one or more components thereof). The internal support may include a brace or plate disposed between the transparent cover and a back face of the shell. The plate may thus act as a structural backbone or central chassis within the enclosure of the electronic device. While the plate may add to the thickness of the device, the presence of the internal support may allow other components to be thinner or removed entirely. As a result, the net effect may be a thinner and/or more structurally rigid device.

The presence of the internal support may reduce reliance on the external case or shell of the electronic device for structural support. A thinner, more skin-like shell may thus be used. A wider variety of materials may be used for the shell. The availability of other materials may be useful for aesthetic, design, or other functional purposes.

The internal support may be useful in connection with electronic devices having touchscreens, such as mobile phones, tablets, or other portable touchscreen devices. Structural rigidity may be achieved by stacking components of the electronic device on or around the internal support. Stacking the components on the internal support may avoid a drum-like construction in which the cover glass of a touchscreen and other display components deflect under user touches. With the internal support, deflection (or flexing) of the cover and display-related components may be reduced or prevented without resorting to other constructions, such as thickened cover glass. The structural rigidity may also be useful in other (e.g., non-portable or large) touchscreen devices, such as electronic whiteboards, in which, for example, users may have a tendency to lean against the display during use. The displays in such large screen devices may be very thin and otherwise prone to harmful deflection.

With the internal support, the component stack may form a solid or rigid assembly. The stack may lack air gaps, foam layers, or other flexible or compressible separators between the components. For example, a display module may be bonded or otherwise secured to the internal support. A touch sensor unit of the display module may then be bonded to the transparent cover.

The display module itself may also be a solid structure. The display module may include laminated constituent films or other layers. For example, a touch sensor, a liquid crystal display (LCD) panel, a backlight unit, and/or other components of the display module may be bonded to one another. The display module may also be bonded or otherwise secured to the transparent cover (e.g., cover glass) and the internal support. In devices having a backlight unit, the constituent layers of the backlight unit may be bonded to one another with, for instance, a low-index adhesive material. The absence of air gaps within the backlight unit and elsewhere within the display module may lead to a rigid and robust device assembly supported by the plate of the internal support. The internal support may thus be combined with a display module (or touch display module) in which all adjacent elements or components are bonded together or otherwise secured to one another.

Further structural rigidity may be provided by disposing components on both sides of the plate. For example, the display module and the transparent cover may be disposed in front of the plate, while an electronic module and a battery of the electronic device may be disposed behind the plate.

The internal support may allow a thinner transparent cover to be used. The thinner transparent cover may alleviate the problem of view parallax, in which a user sees a finger or stylus touch as physically distant from the image produced by the electronic device. The transparent cover may be or include a discrete cover glass layer or an exterior surface of the display module, such as a hardened exterior surface of a thin film.

The internal support may provide other benefits. The reduction in deflection may make air gaps within the electronic device unnecessary. Air gaps, such as an air gap between an electronics module and a backlight unit of the display module, may not be necessary to protect the fragile films of the backlight unit. The lack of air gaps may lead to a thinner device profile.

The internal support may include a plurality of flanges extending from edges of the plate. Each flange may be disposed along a respective sidewall of the shell. The flanges and other components of the internal support may thus structurally support the sidewalls of the shell. The presence of the flanges may allow the shell to provide skin strength for the electronic device. The shell may thus be configured as a thin (e.g., skin-like) or other lightweight element. In those cases, the skin-like shell may nonetheless provide structural support, e.g., as in connection with the skin strength of an airplane fuselage. The flanges may define one or more internal spaces in which the components of the electronic device are disposed.

In some cases, the flanges are arranged relative to the plate such that the internal support is tray-shaped. In other examples, the flanges are arranged relative to the plate such that the internal support is has an H-beam-shaped cross-section.

The internal support may also include ledges to which the transparent cover is secured. Each ledge may extend laterally outward from a respective one of the flanges. The internal support may have a one-piece or composite construction.

The internal support is well suited for use with a wide variety of different touch display arrangements. For example, the touch display may be configured in an on-cell touch sensor arrangement or an in-cell touch sensor arrangement. In some cases, rather than having a separate, additional cover, one of the layers or components of the display module may be used as an external display layer. For example, the external display layer may be or include an external polarizer of the display module. The external polarizer may include a hard coating (e.g., powdered or nano-scale glass in a polymer binder) for protection during use. Alternatively or additionally, a color filter glass layer of the display module may be configured and disposed to act as a glass substrate for the external display layer. In such cases, a touch sensor layer may be formed upon or added to the color filter glass layer in an in-cell touch sensor arrangement.

Other aspects of the electronic devices may vary as well. For instance, although described in connection with electronic devices having touchscreens, the internal support may be used in connection with a wide variety of electronic devices, including those not having a touch-sensitive display. The size and form factor of the electronic device may vary considerably. Devices may range from wearable or handheld devices to televisions or other wall-mounted displays or other large-scale devices. Although some aspects relate to displays having a backlight unit, the composition and other characteristics of the display module and other components of the electronic device may also vary. For example, various types of displays may be used, including, for instance, organic light emitting device (OLED) displays and plasma displays.

Figure 1:
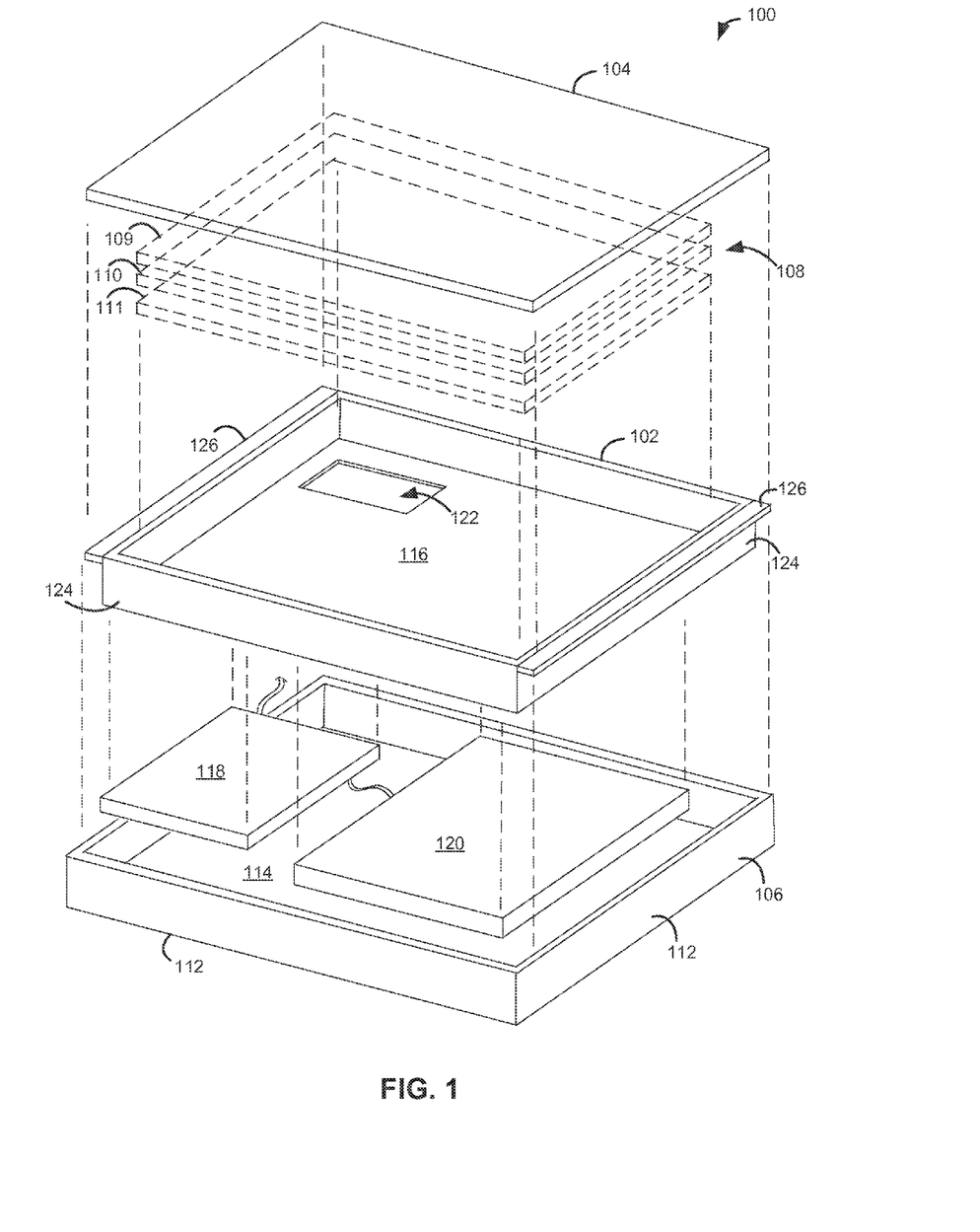
FIG. 1 is a schematic, exploded, perspective view of an electronic device having an internal support in accordance with one example.

FIG. 1 shows an electronic device 100 having an internal support 102. In this example, the electronic device 100 includes a transparent cover 104 and a shell 106 disposed opposite the transparent cover 104. The transparent cover 104 acts as an external display layer of the electronic device 100. The transparent cover 104 may be composed of one or more layers of glass (e.g., chemically strengthened or non-strengthened glass) and/or plastic. In other examples, the external display layer of the electronic device 100 may be an integral layer or component of a display module 108. The side of the device 100 on which the external display layer is disposed is referred to herein as a front side for ease in description. The shell 106 may be shaped as a case configured to provide a back or rear cover of the electronic device 100.

The internal support 102 is one of several internal components of the device 100 disposed between the transparent cover 104 and the shell 106. In some cases, the transparent cover 104 and the shell 106 may collectively enclose the internal support 102 and other internal components of the device 100. In other cases, additional structures, such as a side-mounted antenna, may also be used to enclose the internal components. An exploded view of the device 100 is shown to schematically depict a number of the internal components. In still other cases in which a separate transparent cover is not included, the internal support 102 is disposed between the shell and a component of the display module 108, such as an external polarizer, acting as the external display layer.

In the example of FIG. 1, the display module 108 is adjacent to the transparent cover 104. In some cases, the transparent cover 104 and the display module 108 are contiguous with one another. The transparent cover 104 and the display module 108 may be adhesively bonded or otherwise secured to one another. In other cases, one or more transparent films, layers, or other structures are disposed between the transparent cover 104 and the display module 108.

The display module 108 is shown in simplified form in FIG. 1 for ease in illustration. The display module 108 includes multiple units or panels 109-111 arranged in respective layers. In this example, the display module 108 includes a front (or top) unit 109, a middle unit 110, and a rear (or bottom) unit 111. Each unit 109-111 may be a composite structure that includes multiple constituent layers or films. Each layer or film may be considered a component of the display module 108. The front unit 109 may be a touch sensor unit or panel. In some cases, the touch sensor unit 109 may be formed on the back side of the transparent cover 104 or added thereto as a film, as in an on-cell touch sensor arrangement. The middle unit 110 may be a liquid crystal display (LCD) panel. The LCD panel may include a liquid crystal layer disposed between two glass layers, e.g., a color filter layer and an active matrix layer. The rear unit 111 may be a backlight unit.

The display module 108 may include additional, fewer, or alternative units, panels, or layers. For example, the display module 108 may not include a backlight unit (in, e.g., cases in which an OLED display is used). Alternatively or additionally, one or more components or layers of the units 109-111 may be integrated with the transparent cover 104. For example, the transparent cover 104 may be replaced by one or more components or constituent layers of the display module 108. For example, the display module 108 may include a touch sensor panel pre-applied to the outer surface of the color filter layer of the LCD panel 110 in an in-cell touch sensing arrangement. In such cases, the external display layer of the device 100 may be provided by the external polarizer of the LCD panel 110. The relative positions of the units 109-111 (and/or constituent layers thereof) may thus vary. The extent to which the units 109-111 are integrated may also vary.

The display module 108 may be a solid or rigid structure. An exploded view of the display module 108 is shown in FIG. 1 for ease in illustration of the multiple optical layers 109-111. Adjacent units or panels 109-111 of the display module 108 may be bonded or otherwise secured to one another. In some cases, one or more of the units 109-111 includes laminated layers or films. An adhesive sheet or film may be used to secure the adjacent units 109-111 to one another. For example, the touch sensor unit 109 may be bonded to a top or upper surface of the LCD panel 110.

To the extent that one of the units 109-111 of the display module 108 is a composite panel or unit, that unit may also be configured as a solid structure. For example, the LCD panel 110 may be configured as a solid LCD cell. Each layer of the LCD cell is bonded to an adjacent layer of the cell. The backlight unit 111 may be a solid backlight module, which may include a light guide plate and one or more light management films bonded to each side of the light guide plate.

The configuration and construction of the units 109-111 of the display module 108 may vary. In some cases, the touch sensor unit 109 may be or include the Exclear touch sensor film commercially available from Fujifilm Corporation, but other sensors and/or sensor films may be used. The LCD panel 110 may be configured as an in-plane switched (IPS) display or a plane-to-line switched (PLS) display, but other types of display technologies may be used, such as vertical alignment (VA) displays.

The shell 106 may define an external surface of the device 100 opposite that of the transparent cover 104. In some cases, the shell 106 is shaped as a bucket, tray, or other container in which the internal components of the device 100 are disposed. In this example, the shell 106 includes sidewalls 112 that extend upward from a back cover 114. The sidewalls 112 may define a bucket-shaped space in which the internal support 102 and other internal components are disposed. The sidewalls 112 may or may not be orthogonally oriented to the back cover 114. In some cases, the sidewalls 112 and/or the back cover 114 may be curved.

The shell 106 may have a one-piece construction. For example, the sidewalls 112 and the back cover 114 may be integrally formed. In other cases, the shell 106 may be a composite structure. For example, the shell 106 may include a bezel or other peripheral component that forms the sidewalls 112. In some cases, the bezel or sidewalls 112 may be configured as, or include, one or more antenna strips. Each antenna strip may be composed of a metal or other conductive material, while the back cover 114 may be composed of a plastic or other non-conductive material. A variety of other shell configurations and constructions may be used. For example, in some cases, the shell 106 does not include sidewalls. In such cases, the transparent cover 104 may be curved or include sidewalls that meet the back cover 114 of the shell 106. In other examples, both the transparent cover 104 and the shell 106 are curved to meet one another or another component of the external surface.

The transparent cover 104 (or other external display layer) and the shell 106 may enclose the display module 108 (or one or more components thereof), the internal support 102, and other internal components of the device 100. The transparent cover 104 and the shell 106 may define an interior space of the device 100. In other cases, one or more additional components may define the interior space. Thus, other components of the device 100 may be disposed along an exterior surface of the device 100. For example, in some cases, a ledge or other peripheral portion of the internal support 102 may be disposed along the lateral edges of the device 100 and, thus, form part of the exterior surface.

The internal support 102 structurally supports the transparent cover 104 (or other external display layer), the display module 108 (or components or layers thereof), and/or other internal components of the device 100. The internal support 102 includes a plate 116 disposed between the transparent cover 104 and the shell 106. The internal support 102 may be disposed within the interior space defined by the transparent cover 104 and the shell 106. The support 102 may thus be considered an internal or interior support structure. For example, the internal support 102 may be disposed roughly in the middle of the interior space. In these and other cases, other internal components of the device 100 may be disposed on both sides of the plate 116. In the example of FIG. 1, the display module 108 is disposed on a top or front side of the plate 116, while an electronics module 118 and a battery 120 are disposed on a bottom or rear side of the plate 116. The positioning of these and/or other components may vary. In some cases, the plate 116 is disposed closer to the transparent cover 104 than the shell 106, or vice versa. The internal support 102 may nonetheless provide internal structural support in the fore-and-aft dimension, e.g., in both the forward and backward directions.

The support 102 may be considered an internal support due to the lateral area over which the support is provided. The internal support 102 may provide the support over a lateral area that includes a central or inner area of the interior space of the device 100. The display module 108, transparent cover 104, and/or other components of the device may thus be supported in the central area, as opposed to merely along the periphery of the device 100 (e.g., near the sidewalls 112 of the shell 106).

The plate 116 may extend over an entire lateral extent of the display module 108 to provide the support within the central or inner area of the interior space. For example, the plate 116 may extend across an entire viewable area of the display module 108. The plate 116 may nonetheless include one or more openings, such as opening 122. The opening 122 may be used as a cable pass-through and/or for other purposes. For example, one or more flex cables and/or other connectors may pass through the opening 122 to communicatively couple the display module 108 and the electronics module 118. Alternative or additional openings may be provided for mounting purposes. The plate 116 may have any number of openings of varying size and still provide structural support in the central area for the display module 108 and other components of the device 100. The plate 116 may also have any number of indentations to accommodate the shape or size of other internal components of the device 100. The plate 116 may thus be flat or generally flat.

The internal support 102 may include a plurality of flanges 124 extending from edges of the plate 116. Each flange 124 may be configured as, or include, a sidewall or peripheral face of the internal support 102. In the example of FIG. 1, the plate 116 and the flanges 124 are arranged such that the internal support 102 is tray-shaped. Each flange 124 may thus extend upward (or forward) from the plate 116. In other examples, one or more of the flanges 124 extends both upward (or forward) and downward (or rearward) from the plate 116.

Each edge of the plate 116 may or may not have a respective one of the flanges 124 extending therefrom. For example, in other cases, only two flanges 124 are provided, such that a pair of opposing edges do not include flanges.

Each flange 124 may be disposed along one of the sidewalls 112 of the shell 106. The flanges 124 may follow the contour of the sidewalls 112. For example, the flanges 124 may be orthogonally oriented relative to the plate 116 if the sidewalls 112 are orthogonally oriented relative to the back cover 114. In other examples, the flanges 124 may be oriented at other angles relative to the plate 116.

The positioning of the flanges 124 along the sidewalls 112 may allow the internal support 102 to provide structural support in the lateral dimension(s). For instance, each sidewall 112 may be laterally supported by one of the flanges 124. The plate 116 may thus act as a brace supporting the sidewalls 112. With the lateral support from the flanges 124, the structural demands on the sidewalls 112 may not be as stringent. As a result, the sidewalls 112 may or may not be mechanically rigid. The sidewalls 112 may be configured for one or more other purposes, such as ornamental purposes or operational purposes (e.g., to act as an antenna). In some cases, the sidewalls 112 are composed of one or more low cost, lightweight materials, such as an injection-molded plastic material.

The flanges 124 may define an internal space in which the display module 108 is disposed. The internal space is disposed along a front side of the plate 116. In this example, the flanges 124 collectively laterally surround the internal space. In other examples, the flanges 124 may define the internal space without laterally surrounding the internal space. For example, the number of flanges 124 may not correspond with the number of sidewalls 112 of the shell 106.

In the example of FIG. 1, the internal support 102 includes a plurality of ledges 126. Each ledge 126 extends outward from one of the flanges 124. In this example, two ledges 126 extend outward from two opposing flanges 124. The other two flanges 124 do not have ledges. In other cases, each flange 124 has a corresponding ledge 126 extending therefrom. Each ledge 126 forms a shelf on which the transparent cover 104 (or other external display layer) may be mounted.

The transparent cover 104 (or other external display layer) may be fixedly secured to the plurality of ledges 126. In some cases, an adhesive layer or material is used to secure the transparent cover 104 to the ledges 126. To provide a suitable mounting surface, the ledges 126 may be disposed along the rim defined by the flanges 124. For example, the ledge surface of each ledge 126 may be flush with an upper end or edge face of the flanges 124 from which the ledges 126 extend. The transparent cover 104 may thus also be secured to one or more of the flanges 124.

In cases in which an integral component of the display module 108 is used as the external display layer, the components of the display module 108 may be sized differently to engage the ledges 126. For example, the color filter layer of the LCD panel 110 may be larger than the active matrix layer 110 such that the color filter layer engages the ledges 126. The cover glass or other external layer of an OLED display module may be similarly configured for bonding to the ledges 126. The cover glass of the OLED display module may nonetheless be considered a display layer regardless of whether the cover glass provides a display function (e.g., polarization). Either way, the cover glass protects the remainder of the OLED display module from moisture ingress.

The electronics module 118 and the battery 120 may be secured to the internal support 102. The internal support 102 may be configured such that the electronics module 118 and the battery 120 may be mounted to the plate 116. For example, the plate 116 may have a number of screw bosses integrally formed thereon or fabricated thereon. Screw or other fasteners (e.g., adhesive materials) may then be used to secure the electronics module 118 and the battery 120 to the rearward facing side of the plate 116. The assembly of the internal support 102 and the electronics module 118 and the battery 120 may then be dropped into the bucket formed by the shell 106. In other cases, the electronics module 118 and the battery 120 may be press-fit or otherwise secured to the internal support 102 and/or the shell 106.

The internal support 102 may be composed of various plastic or other dielectric materials, such as dielectric materials used for printed circuit boards (e.g., FR-6). In these and other cases, the internal support 102 may be manufactured via injection molding or other mold processes. Alternatively or additionally, the internal support 102 may be composed of one or more metals or metal alloys. In these examples, the internal support 102 may be die-cast aluminum, magnesium, or other metals or metal alloys.

The internal support 102 may have a one-piece or multi-piece construction. For example, the plate 116 may be composed of one material, while the flanges 124 and/or the ledges 126 are composed of another material (or other materials). In such cases, the flanges 124 and/or the ledges 126 may be secured via adhesive materials and/or other fasteners.

Due to the support provided by the internal support 102, the back cover 114 and other portions of the shell 106 may be composed of one or more low cost, lightweight materials. The shell 106 may or may not be mechanically rigid. The support provided by the internal support 102 provides such flexibility in design. The shell 106 may be formed via plastic injection molding. The back cover 114 may be secured to the other outer components of the device 100, such as the internal support 102, the transparent cover 104, and/or the sidewalls 112 of the shell 106 via adhesive material(s) and/or clips or other fasteners.

The construction and configuration of the device 100 may vary from the example shown in FIG. 1. For instance, the transparent cover 104 may be integrated with one or more components of display module 108. The display module 108 itself may also vary considerably. For example, the display module 108 may or may not be configured as a touchscreen. The display module 108 may or may not include a backlight unit, and different types of backlight units may be used. Different types of display technologies may be used, including, for instance, various types of LCD displays, such as super-twisted nematic and other twisted nematic LCD displays, OLED displays, plasma displays, and various thin-film transistor (TFT) displays. The configuration and construction of the touch sensors of the touchscreen may also vary.

Figure 2:
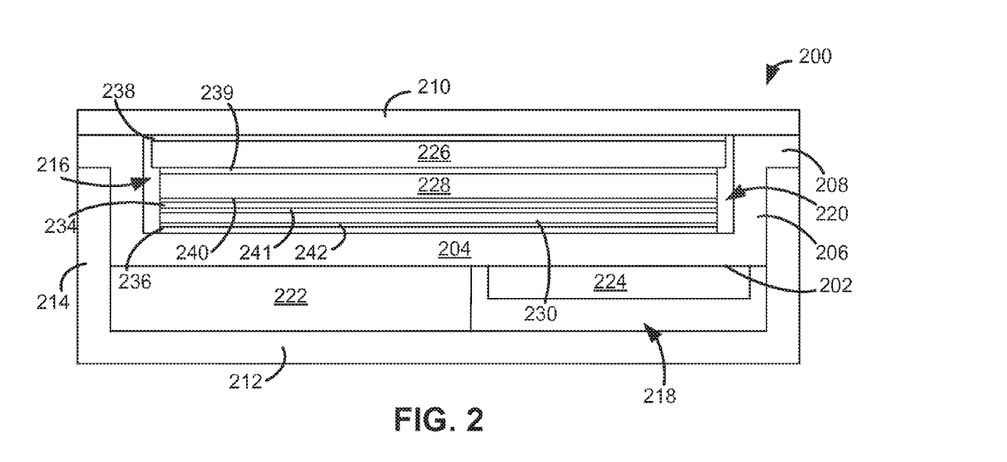
FIG. 2 is a schematic, cross-sectional view of an electronic device having a tray-shaped internal support and a solid display module bonded to a transparent cover in accordance with one example.

FIG. 2 is a cross-sectional view of an electronic device 200 having an internal support 202. The electronic device 200 may correspond with the electronic device 100 shown in FIG. 1. The cross-sectional view of FIG. 2 shows the electronic device 200 as assembled to better depict the positioning of the various components described above. As in the example of FIG. 1, the internal support 202 is tray-shaped with a plate 204, flanges 206 extending upward from the plate 204, and ledges 208 extending outward from the flanges 206. A transparent cover 210 is mounted upon, and secured to, the flanges 206 and the ledges 208. The flanges 206 and/or the ledges 208 may also be secured to a shell 212. The flanges 206 are disposed along sidewalls 214 of the shell 212. The plate 204 is disposed between the transparent cover 210 and the shell 212, and may extend across the entire lateral extent of a display area of the device 200 as shown.

The internal support 202 defines internal spaces 216 and 218 in which internal components of the device 200 are disposed. The internal space 216 is located above or forward of the internal support 202. The internal space 218 is located below or rearward of the internal support 202. In this example, a display module 220 is disposed within the internal space 216, while a battery 222 and an electronics module 224 are disposed in the internal space 218.

The internal support 202 and/or other components of the device 200 may be configured to avoid air gaps in the internal spaces 216 and 218 when the device 200 is assembled. In the example of FIG. 2, with the exception of one or more adhesive films or layers, the display module 220 is contiguous both with the transparent cover 210 and the internal support 202. The battery 222 may also be contiguous with the internal support 202 and the shell 204. Thus, no air gaps are present along cross-sectional lines oriented into the plane of FIG. 2 that cut through the display module 220 and the battery 222. The device 200 along those cross-sectional lines is effectively constructed as a solid device. The absence of air gaps on either side of the display module 202 may support the transparent cover 210, thereby preventing or minimizing flexure or deflection thereof.

The internal support 202 and the shell 212 may be sized or otherwise configured to avoid air or other gaps from the transparent cover 210 to the shell 212. As shown in FIG. 2, the sidewalls 214 of the shell 212 and the flanges 206 of the internal support 202 may be sized to correspond with the cumulative thickness of the internal components of the device 200. For example, the flanges 206 may be sized such that the thickness of the internal space 216 matches the cumulative thickness of the display module 220. The sidewalls 214 and the flanges 206 may be sized such that the thickness of the internal space 218 matches the thickness of the battery 222. The respective thicknesses of the internal spaces 216, 218 may differ based on the respective thicknesses of the internal components, as well as on which internal components are disposed on either side of the plate 204.

In the example of FIG. 2, one air gap is present between the electronics module 224 and the shell 212. The air gap arises from the electronics module 224 not being as thick as the battery 222. The air gap may be useful for allowing air flow across the electronics module 224 for cooling purposes. Alternatively or additionally, the electronics module 224 may be enclosed in a housing having a thickness that corresponds with the thickness of the battery 222. In such cases, the only air gap may be disposed within the electronics housing.

The foregoing references to the absence of air gaps does not include lateral air gaps, such as those disposed between side-by-side components. The internal spaces 216, 218 may include a number of lateral air gaps on either side of the internal support 202. For example, lateral air gaps may be present between certain edges or ends of the display module 220 and the flanges 206. Lateral air gaps may also be present between the battery 22 and the electronics module 224. However, these and other lateral air gaps do not significantly affect the extent to which the transparent cover 210 is capable of flexing.

FIG. 2 also depicts an example in which the display module 220 includes a stack of optical layers or films. The display module stack 220 is structurally supported by the internal support 202. The display module stack 220 is disposed between the transparent cover 210 and the internal support 202. In this example, the display module stack includes a touch sensor unit 226, an LCD unit 228, and a backlight unit 230. The touch sensor unit 226 may include one or more layers disposed between the transparent cover 210 and the remainder of the display module stack. The LCD unit 228 may include one or more layers disposed between the touch sensor unit 226 and the backlight unit 230. The backlight unit 230 may include a light guide plate 232 and various light management films or layers, examples of which are schematically shown at 234, 236 and disposed on one or both sides of the light guide plate 232. In this example, one of the light management films 236 (e.g., a reflector film) is disposed along and secured to the internal support 202.

The display module 220 itself may be configured such that no air or other gaps are present between adjacent layers or films of the display module stack. Each pair of adjacent layers may be contiguous with one another with the exception of an adhesive layer or film therebetween. The absence of air gaps within the display module 220 may form a solid or rigid module. The rigidity of the display module 220 may further support the transparent cover 210 and, for instance, prevent or minimize flexure or deflection during use.

The constituent layers or films of the display module 220 may be adhesively secured to one another to increase the solidity and/or rigidity of the display module 220 and, thus, the device assembly. In the example of FIG. 2, the adhesive materials are depicted as respective layers or films 238-242. Each film 238-242 may include one or more adhesive materials disposed in a thin film adhesive layer. In some cases, each film 238-242 includes a pressure-sensitive adhesive material. Additional or alternative types of adhesive materials and films may be used, including, for instance, moisture or thermally cured adhesive materials. The adhesive materials may be silicone-based, epoxy-based and/or acrylic-based materials. The adhesive films 238-242 may be used to laminate adjacent layers of the stack may be laminated to one another with a respective thin film adhesive layer.

The adhesive material(s) may be low-index adhesive materials. One or more of the adhesive films 238-242 may have a desired thickness such that light extracted from one layer of the display module 220 experiences an index difference for refraction toward the viewer of the display. Examples of low-index adhesive materials include low index silicone materials, such as Shin-Etsu KER 7000 low index silicone encapsulant (refractive index of 1.380) and acrylic adhesives, such as Nitto Denko CS9621T adhesive (refractive index of 1.492), but other materials may be used. In other cases, the index of refraction of the adhesive materials is about 1.2. Still other materials having refractive indices closer to 1.0 may be used.

The adhesive attachment of the constituent films of the display module 220 may protect the constituent films from damage that may otherwise arise from relative movement of, and/or contact between, adjacent films. Taken alone, one or more the films may be fragile, e.g., such as a fragile membrane. For example, the films may be composed of thin acrylic, polycarbonate, or polyester layers. The lamination or other adhesive attachment of the films may support each respective film from both sides. Thus, while individually weak, the combination and lamination of the constituent films may create a more rigid, robust structure. In one example, the adhesive attachment of a light management film means that the film is no longer capable of sliding laterally or other movement relative to structures, such as light extraction features (e.g., prisms), in or carried on an adjacent film. Sliding over such structures may be capable of damaging the light management film. The structures may also be bent or otherwise damaged through contact. Without such relative movement and contact, improvements in yield and product lifetime may be realized. The adhesive attachment and/or stacking of the internal components may also protect the constituent films from damage that may otherwise arise from the flexure of the transparent cover 210 and/or other events.

The display module 220 may include one or more frames to further support the constituent films or layers of the display module 220. For example, a frame may be disposed along the periphery of the films or layers. In some cases, a number of light sources, such as edge-mounted light emitting diode (LED) devices are carried or otherwise supported by the frame(s). The frame(s) are not shown in the drawing figures for ease in illustration of the display module 220 and the internal support 202, but may be disposed in the lateral space between the layers and the flanges 206 of the internal support 206.

In the example of FIG. 2, the lack of flexure of the transparent cover 210 protects the electronic module 224 and other internal components from adverse impact effects.

If the transparent cover 210 is allowed to deflect during use (e.g., a touch event), then the electronics module 224 may impact another internal component, resulting in damage to the electronics module 224 and/or the other component. The lack of flexure allows the device 200 to be assembled without having to insert foam or other protection layers in the internal spaces 216, 218. The lack of foam or other protection layers, e.g., between the display module 220 and the electronics module 224, may lead to a thinner device profile.

The display module 220 may be bonded to the plate 204 of the internal support 202 with a structural adhesive. The glass or plastic material of the transparent cover 210 may be secured last, using an optically clear adhesive. The transparent cover 210 may be bonded both to the top surface of the display module 220 (e.g., the upper surface of the touch sensor unit 226), and to the flange 206 and the ledge 208 of the internal support 202.

Figure 3:
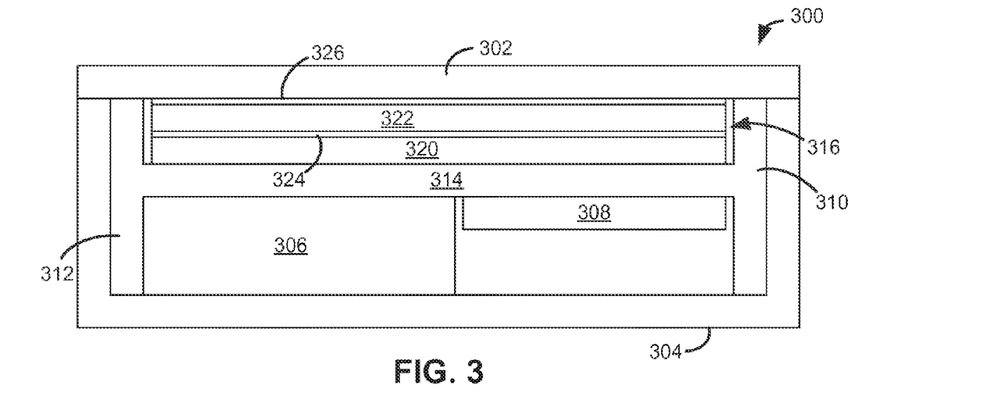
FIG. 3 is a schematic, cross-sectional view of an electronic device having an H-beam-shaped internal support and a solid display module bonded to a transparent cover in accordance with one example.

FIG. 3 depicts another example of an electronic device 300 having a single, solid assembly with high structural rigidity and, thus, components that are not subject to individual creep or flexure. As described above, the components may be much thinner than otherwise provided as a result. The electronic device 300 may be similar to the above-described devices in a number of ways. For instance, the device 300 includes a transparent cover 302 and a shell 304 constructed and/or otherwise configured as described above. A number of internal components may be similarly configured as well, including, for instance, a battery 306 and an electronics module 308.

In the example of FIG. 3, the electronic device 300 has an internal support 310 having an H-shaped cross-section. In contrast to the tray-shaped internal support examples described above, flanges 312 of the internal support 310 extend both upward (forward) and downward (rearward) from a plate 314 that extends across the display area of the device 300. With the flanges 312 extending in both directions, the plate 314 may be considered the web or sheet of an H-beam-like structure. The flanges 312 may extend from edges of the plate 314 and be disposed along sidewalls of the shell 304, and thus provide lateral support for the shell 304 as described above.

The flanges 312 define internal spaces both above and below the plate 314. A display module 316 is disposed in an upper space, while the battery 306 and the electronics module 308 are disposed in a lower space. The plate 314 may be disposed at a position along the flanges 312 such that the upper and lower spaces have respective thicknesses that match or otherwise correspond with the effective thicknesses of the components disposed therein.

In the example of FIG. 3, the display module 316 includes an OLED display unit 320 and a touch sensor unit 322. The OLED display unit 320 and the touch sensor unit 322 may be adhesively secured to one another via an adhesive film 324. The display module 316 may be bonded to the transparent cover 302 via another adhesive film 326 disposed between a top or upper surface of the display module 316 and the transparent cover 302. The transparent cover 302 may also be secured to ends of the flanges 312 and the sidewalls of the shell 304. In other cases, ledges may extend outward from the flanges 312 as described above in connection with the tray-shaped supports.

Figure 4:
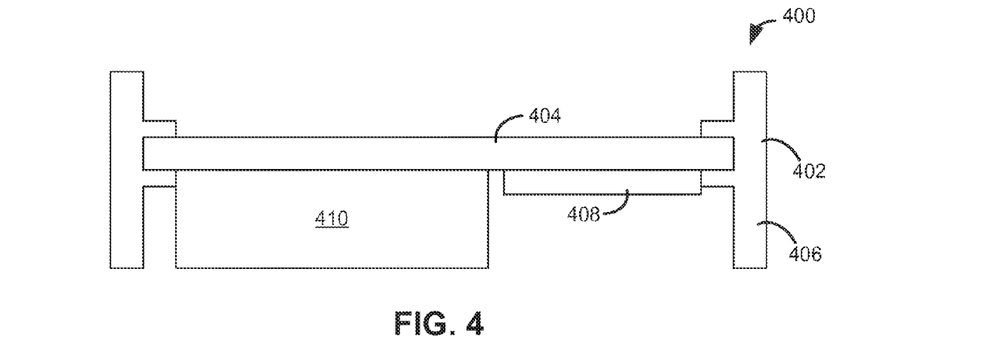
FIG. 4 is a schematic, cross-sectional, partial view of an electronic device having a composite internal support in accordance with one example.

FIG. 4 depicts an example of an electronic device 400 having a composite internal support 402. The composite nature of the internal support 402 differs from the internal supports described above having a one-piece construction. The internal support 402 includes a plate 404 secured to flanges 406. The flanges 406 may be adhesively bonded, overmolded, or otherwise secured (via, e.g., clips or other fasteners) to the plate 404.

The composite nature of the internal support 402 may allow different materials to be used for the plate 404 and/or the flanges 406. In some cases, the plate 404 may include a printed circuit board. For example, the plate 404 may be the motherboard of the electronics module. On one side of the circuit board, electronic circuitry 408 and a battery 410 are mounted. A display module may be adhesively or otherwise secured to the opposite side of the printed circuit board. As in the examples described above, the printed circuit board extends over an entire lateral extent of the display area of the device 400. The printed circuit board may thus extend beyond the electronic circuitry 408 to provide structural support for the other internal components of the device 400.

Figure 5:
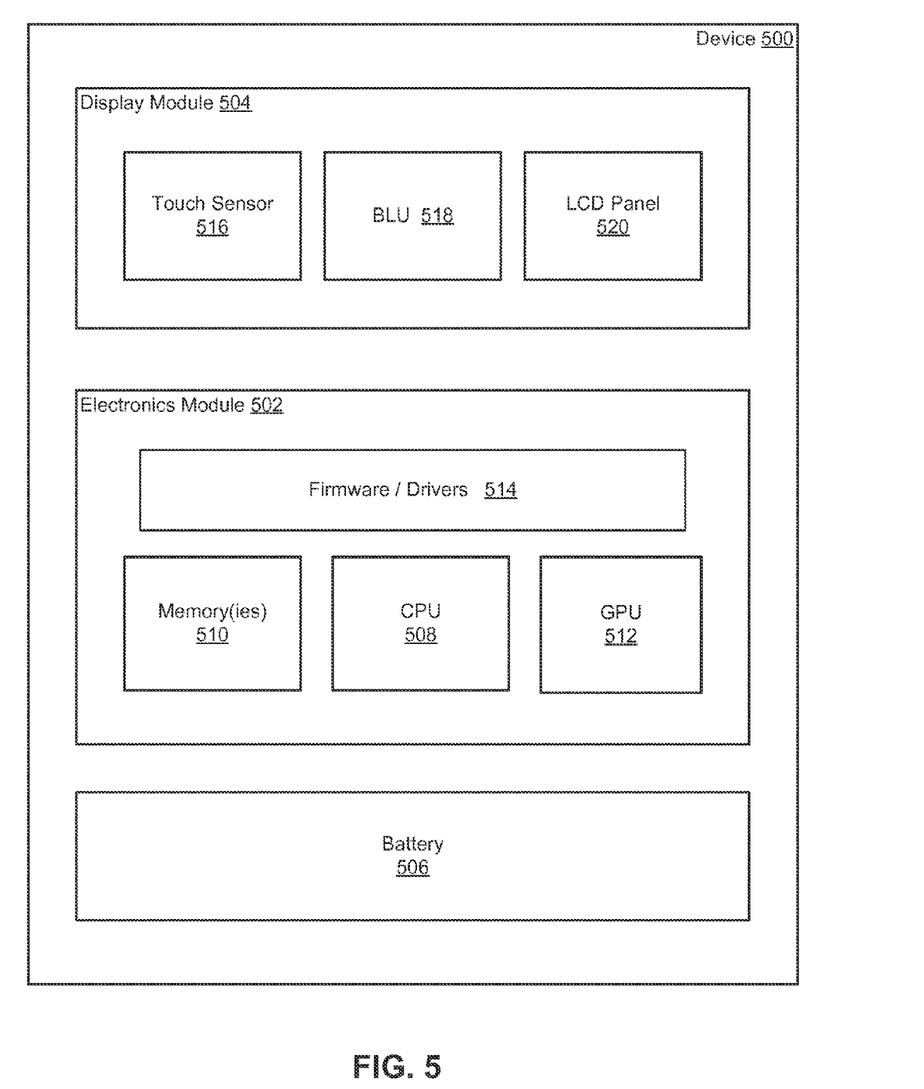
FIG. 5 is a block diagram of an electronic device for which an internal support may be used to support a display module in accordance with one example.

FIG. 5 shows an exemplary electronic device 500 with an electronics module 502, a display module 504 (or subsystem), and a battery 506 that may be supported by the internal supports described above. The display module 504 may be integrated with the electronics module 502 and/or other components of the electronic device 500 to a varying extent. For instance, the electronics module 502 and/or the display module 504 may include a graphics subsystem of the electronic device 500. Any number of display modules or systems may be included. In this example, the device 500 includes a processor 508 and one or more memories 510 separate from the display module 504. The processor 508 and the memories 510 may be directed to executing one or more applications implemented by the device 500. The display module 504 generates a user interface for an operating environment (e.g., an application environment) supported by the processor 508 and the memories 510. The processor 508 may be a general-purpose processor, such as a central processing unit (CPU), or any other processor or processing unit. Any number of such processors or processing units may be included.

In the example of FIG. 5, the electronics module 502 includes a graphics processing unit (GPU) 512 and firmware and/or drivers 514. The GPU 512 may be dedicated to graphics- or display-related functionality and/or provide general processing functionality. Some of the components of the electronics module 502 may be integrated. For example, the processor 508, the one or more of the memories 510, the GPU 512, and/or the firmware 514 may be integrated as a system-on-a-chip (SoC) or application-specific integrated circuit (ASIC). The electronics module 502 may include additional, fewer, or alternative components. For example, the electronics module 502 may not include a dedicated graphics processor, and instead rely on the CPU 508 or other general-purpose processor to support the graphics-related functionality of the electronic device 500. The electronics module 502 may include additional memory (or memories) to support display-related processing.

In the example of FIG. 5, the display module 504 includes a touch sensor unit 516, a backlight unit (BLU) 518, and an LCD panel or unit 520. Additional, fewer, or alternative components may be provided. For example, in some cases, the display module 504 does not include the backlight unit 518 and/or the LCD panel 520. The display module 504 may instead include an OLED display unit.

The device 500 may be configured as one of a wide variety of computing devices, including, but not limited to, handheld or wearable computing devices, such as tablets and watches, communication devices such as phones, laptop or other mobile computers, personal computers (PCs), server computers, set top boxes, programmable consumer electronics, network PCs, minicomputers, mainframe computers, audio or video media players, and other devices.

In one aspect, an electronic device includes an external display layer, a shell disposed opposite the external display layer, a display module component enclosed by the external display layer and the shell, and an internal support that structurally supports the display module component and the external display layer, the internal support comprising a plate disposed between the external display layer and the shell.

In another aspect, an electronic device includes an external display layer, a shell disposed opposite the external display layer, and a plurality of display module layers enclosed by the external display layer and the shell. Each pair of adjacent display module layers of the plurality of display module layers lacks an air gap between the respective pair of adjacent display module layers. The display module is secured to an internal support. The internal support includes a plate disposed between the external display layer and the shell. The plate extends over an entire lateral extent of the plurality of display module layers.

In yet another aspect, an electronic device includes a transparent cover, a display module adjacent the transparent cover, a shell disposed along a face opposite the transparent cover, and an internal support disposed between the transparent cover and the shell. The display module includes a plurality of optical films adhesively secured to one another. The internal support includes a plate to which the display module is secured. The plate extends over an entire lateral extent of the display module.

In connection with any one of the aforementioned aspects, the electronic device may alternatively or additionally include any combination of one or more of the following aspects or features. The internal support includes a plurality of flanges, each flange extending from a respective edge of the plate. Each flange of the plurality of flanges is disposed along a respective sidewall of the shell. The plurality of flanges define an internal space in which the display module is disposed. The internal support includes a plurality of ledges, each ledge of the plurality of ledges extending outward from a respective flange of the plurality of flanges. The external display layer is fixedly secured to the plurality of ledges. The electronic device further includes an electronics module coupled to the display module component and a battery coupled to the electronics module. The plurality of flanges and the plate define an internal space in which the electronics module and the battery are disposed. The electronics module is communicatively coupled to the display module component via a hole in the plate. In some cases, the internal support has an H-shaped cross-section. The plate extends over an entire lateral extent of the display module component. The display module component is one of a plurality of optical layers, adjacent optical layers of the plurality of optical layers being laminated to one another with a respective thin film adhesive layer. The display module component is disposed in a stack of optical films without air gaps between adjacent optical films of the stack of optical films. The plate structurally supports the stack of optical films. The electronic device further includes electronic circuitry communicatively coupled to the display module component, in which the plate includes a printed circuit board having a first side on which the electronic circuitry is disposed, and the printed circuit board has a second side opposite the first side to which the display module component is secured.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. An electronic device comprising:
   an external display layer;
   a shell disposed opposite the external display layer;
   a plurality of display module components enclosed by the external display layer and the shell, the plurality of display module components comprising a backlight unit having a stack of laminated optical films; and
   an internal support that structurally supports the plurality of display module components and the external display layer, the internal support comprising a plate disposed between the external display layer and the shell,
   wherein adjacent display module components of the plurality of display module components are secured to one another with a respective thin film adhesive layer, and
   wherein each optical film in the stack of optical films of the backlight unit is laminated to an adjacent optical film in the stack of optical films.

2. The electronic device of claim 1, wherein the internal support comprises a plurality of flanges, each flange extending from a respective edge of the plate.

3. The electronic device of claim 2, wherein each flange of the plurality of flanges is disposed along a respective sidewall of the shell.

4. The electronic device of claim 2, wherein the plurality of flanges defines an internal space in which the display module component is disposed.

5. The electronic device of claim 2, wherein:
   the internal support comprises a plurality of ledges, each ledge of the plurality of ledges extending outward from a respective flange of the plurality of flanges; and
   the external display layer is fixedly secured to the plurality of ledges.

6. The electronic device of claim 2, further comprising:
   an electronics module coupled to the plurality of display module components; and
   a battery coupled to the electronics module;
   wherein:
   the plurality of flanges and the plate define an internal space in which the electronics module and the battery are disposed; and
   the electronics module is communicatively coupled to the plurality of display module components via a hole in the plate.

7. The electronic device of claim 1, wherein the internal support has an H-shaped cross-section.

8. The electronic device of claim 1, wherein the plate extends over an entire lateral extent of the plurality of display module components.

9. The electronic device of claim 1, wherein the display module component is one of a plurality of optical layers, adjacent optical layers of the plurality of optical layers being laminated to one another with a respective thin film adhesive layer.

10. The electronic device of claim 1, wherein:
the display module component is disposed in a stack of optical films without air gaps between adjacent optical films of the stack of optical films; and
the plate structurally supports the stack of optical films.

11. The electronic device of claim 1, further comprising electronic circuitry communicatively coupled to the plurality of display module components, wherein:
the plate comprises a printed circuit board having a first side on which the electronic circuitry is disposed; and
the printed circuit board has a second side opposite the first side to which the plurality of display module components is secured.

12. The electronic device of claim 1, wherein each optical film in the stack of optical films is bonded to a respective adjacent optical film with an adhesive material.

13. An electronic device comprising:
an external display layer;
a shell disposed opposite the external display layer;
a plurality of display module components enclosed by the external display layer and the shell, the plurality of display module components comprising a touch sensor unit having a stack of films; and
an internal support to which the display module is secured, the internal support comprising a plate disposed between the external display layer and the shell, the plate extending over an entire lateral extent of the plurality of display module components,
wherein adjacent display module components of the plurality of display module components are secured to one another with a respective thin film adhesive layer,
wherein each pair of adjacent display module components of the plurality of display module components lacks an air gap between the respective pair of adjacent display module components, and
wherein each film in the stack of films of the touch sensor unit is laminated to an adjacent film in the stack of films.

14. The electronic device of claim 13, wherein:
the internal support comprises a plurality of flanges extending from edges of the plate;
the internal support comprises a plurality of ledges, each ledge of the plurality of ledges extending outward from a respective flange of the plurality of flanges; and
the external display layer is fixedly secured to the plurality of ledges.

15. The electronic device of claim 13, wherein:
the shell comprises a plurality of sidewalls that define a bucket-shaped space in which the internal support is disposed;
the internal support comprises a plurality of flanges, each flange extending from a respective edge of the plate; and
each flange is disposed along a respective sidewall of the plurality of sidewalls.

16. The electronic device of claim 13, wherein adjacent display module components of the plurality of display module components are laminated to one another with a respective thin film adhesive layer.

17. An electronic device comprising:
a transparent cover;
a display module adjacent the transparent cover, the display module comprising a plurality of display module components adhesively secured to one another, the plurality of display module components comprising: (1) an organic light emitting diode (OLED) display component and (2) a touch sensor unit having a stack of films;
a shell disposed along a face opposite the transparent cover;
an internal support disposed between the transparent cover and the shell, the internal support comprising a plate to which the display module is secured, the plate extending over an entire lateral extent of the display module;
wherein each film in the stack of films of the touch sensor unit is laminated to an adjacent film in the stack of films.

18. The electronic device of claim 17, wherein:
the internal support comprises a plurality of flanges, each flange extending from a respective edge of the plate; and
each flange is disposed along a respective sidewall of the shell to define an internal space in which the display module is disposed.

19. The electronic device of claim 18, wherein the internal support has an H-shaped cross-section.

20. The electronic device of claim 19, further comprising:
electronic circuitry coupled to the display module; and
a battery coupled to the electronic circuitry;
wherein the plate and the plurality of flanges define a further internal space in which the electronic circuitry and the battery are disposed.

21. The electronic device of claim 20, wherein:
the plate comprises a printed circuit board on which the electronic circuitry is disposed;
the printed circuit board extends over the entire lateral extent of the display module; and
the plurality of flanges is secured to the printed circuit board.

* * * * *